United States Patent
Chen et al.

(10) Patent No.: US 10,837,797 B2
(45) Date of Patent: Nov. 17, 2020

(54) METHOD FOR SORTING UNSYSTEMATIC ENVIRONMENT RISK OF UNDERGROUND STORAGE TANK SYSTEMS

(71) Applicant: Environmental Protection Administration, R.O.C., Taipei (TW)

(72) Inventors: Shyh-Wei Chen, Taipei (TW); Chun-Ming Chen, Taipei (TW); I-Hsing Chen, Taipei (TW); Fu-Chieh Chang, Taipei (TW); Hsuan-Ting Lai, Taipei (TW); Yu-Yun Hsieh, Taipei (TW); Chun-Chun Lin, Taipei (TW)

(73) Assignee: Environmental Protection Administration, R.O.C., Taipei (TW)

( * ) Notice: Subject to any disclaimer, the term of this patent is extended or adjusted under 35 U.S.C. 154(b) by 276 days.

(21) Appl. No.: 16/173,965

(22) Filed: Oct. 29, 2018

(65) Prior Publication Data
US 2020/0041305 A1 Feb. 6, 2020

(30) Foreign Application Priority Data
Aug. 3, 2018 (TW) .............................. 107127079 A

(51) Int. Cl.
*G06F 11/30* (2006.01)
*G01D 1/00* (2006.01)
*B65D 90/50* (2019.01)
*B65D 88/76* (2006.01)

(52) U.S. Cl.
CPC ............... *G01D 1/00* (2013.01); *B65D 88/76* (2013.01); *B65D 90/50* (2013.01)

(58) Field of Classification Search
CPC ....................................................... G01D 1/00
See application file for complete search history.

(56) References Cited

U.S. PATENT DOCUMENTS

| 5,821,403 A | * | 10/1998 | Montgomery | ....... | B67D 7/3209 |
| | | | | | 73/40.5 R |
| 2014/0378319 A1 | * | 12/2014 | Regberg | ................. | G01N 33/92 |
| | | | | | 506/2 |

* cited by examiner

*Primary Examiner* — Phuong Huynh
(74) *Attorney, Agent, or Firm* — Juan Carlos A. Marquez; Marquez IP Law Office, PLLC

(57) ABSTRACT

A method for sorting unsystematic environment risk of underground storage tank systems includes: generating an unsystematic environmental site assessment priority list for the underground storage tank systems using a risk weight assessment module based on facility level factor data and operational status factor data of each underground storage tank system; obtaining an actual soil gas detection data for each underground storage tank system after conducting an environmental site assessment on the priority list; and generating an investigation list according to the contamination potential assessment result of each underground storage tank system using a contamination potential assessment module based on the actual soil gas detection data as a basis for subsequent investigation and regulation on the underground storage tank systems.

11 Claims, 1 Drawing Sheet

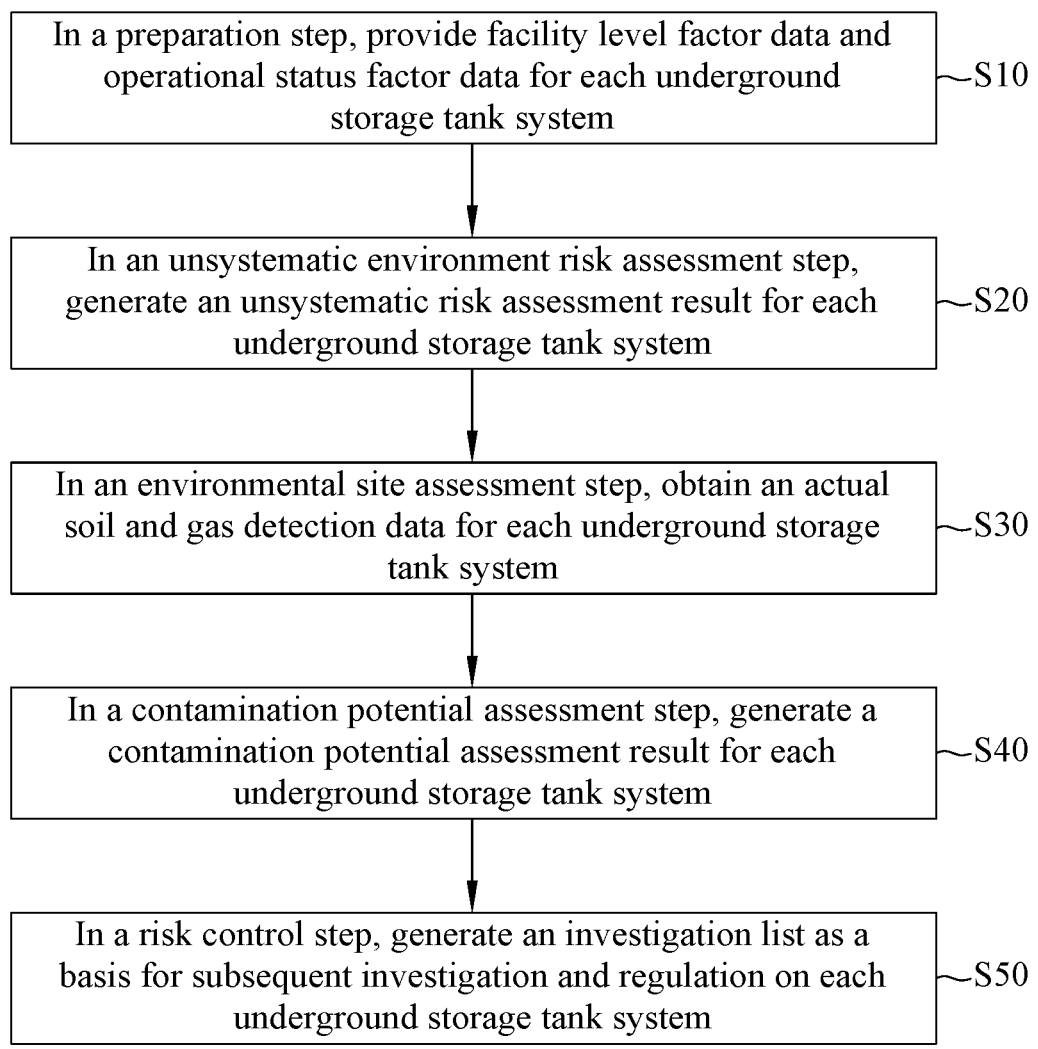

METHOD FOR SORTING UNSYSTEMATIC ENVIRONMENT RISK OF UNDERGROUND STORAGE TANK SYSTEMS

CROSS-REFERENCE TO RELATED APPLICATION

This application claims the priority of Taiwanese patent application No. 107127079, filed on Aug. 3, 2018, which is incorporated herewith by reference.

BACKGROUND OF THE INVENTION

1. Field of the Invention

The present invention relates to a method for sorting unsystematic environment risk of underground storage tank systems to regulate the underground storage tank systems with a high environment risk level.

2. The Prior Arts

An underground storage tank system refers to storage tanks for storing gasoline/diesel, and pipelines connected to the storage tanks for loading and unloading gasoline/diesel, which are buried under the ground surface. These underground storage tank systems are mainly used in gas stations, and come second used in factories. Since the underground storage tank system is buried under the ground surface for a long time, corrosion and leakage are not easy to be detected. Hence, when leakage pollution is eventually detected, there may result in a serious and irreversible environmental damage. Furthermore, leakage pollution is relevant with the operation of the underground storage tank systems, and thus its risk characteristic is belonged to a non-systematic risk. Each individual underground storage tank system has a different environmental risk level. It is necessary to screen out the underground storage tank systems with a high environmental risk level in a most effective way to achieve an early detection and early remediation.

Regarding how to screen out the underground storage tank systems with a high environmental risk level, the traditional practice is to generate an investigation priority list based on the establishment date of the gas stations (factories) recorded in business licenses or factory registration data, and then investigate and regulate the gas stations (factories) in the investigation priority list. Although there exists a certain correlation between the age of the gas stations (factories) and leakage pollution, one cannot say an underground storage tank system of a gas station (factory) with an operation period of more than 40 years definitely has leakage pollution or an underground storage tank system of the gas station (factory) with an operation period of less than 10 years is definitely leak-free and pollution-free. In considering that the underground storage tank systems may undergo equipment replacement during the operation period, the environmental risk level of an underground storage tank system determined merely based on the gas station (factory) age factor cannot reflect the actual environmental risk level of the underground storage tank system.

Therefore, it would often require too much manpower, resource and time to regulate a large number of underground storage tank systems operated in various ways by using the traditional method.

SUMMARY OF THE INVENTION

In view of the above-mentioned problems resulted in the traditional environment risk control method, an objective of the present invention is to provide a method for sorting unsystematic environment risk of underground storage tank systems, which can generate a risk assessment result closer to the actual condition of the underground storage tank systems so as to efficiently conduct subsequent investigation and regulation on the underground storage tank systems.

According to the present invention, a method for sorting unsystematic environment risk of underground storage tank systems includes: a preparation step, providing a baseline database for the underground storage tank systems, the baseline database including facility level factor data and operational status factor data for each underground storage tank system; an unsystematic environment risk assessment step, generating an unsystematic risk assessment result for each underground storage tank system using an entropy weight assessment module based on the facility level factor data and the operational status factor data of the baseline database; an environmental site assessment step, generating an environmental site assessment list based on the unsystematic risk assessment result and obtaining an actual soil gas detection data for each underground storage tank system in the environmental site assessment list; a contamination potential assessment step, generating a contamination potential assessment result using a contamination potential assessment module based on the actual soil gas detection data for each underground storage tank system; and a risk control step, generating an investigation list according to the contamination potential assessment result of each underground storage tank system as a basis for subsequent investigation and regulation on the underground storage tank systems.

Preferably, the facility level factor data is selected from a group consisting of a storage tank material factor ($A_1$), a storage tank protection measure factor ($A_2$), a pipeline material factor ($A_3$) and a pipeline protection measure factor ($A_4$), and the operational status factor data is selected from a group consisting of a monthly average gasoline quantity factor ($B_1$), a storage tank usage time factor ($B_2$) and a pipeline usage time factor ($B_3$).

Preferably, in this embodiment, the unsystematic risk score (URS) is a sum of the following factors: a product of the storage tank material factor ($A_1$) and a storage tank material weight factor ($W_{A1}$); a product of the storage tank protection measure factor ($A_2$) and a storage tank protection measure weight factor ($W_{A2}$); a product of the pipeline material factor ($A_3$) and a pipeline material weight factor ($W_{A3}$); a product of the pipeline protection measure factor ($A_4$) and a pipeline protection measure weight factor ($W_{A4}$); a product of the monthly average gasoline quantity factor ($B_1$) and a monthly average gasoline quantity weight factor ($W_{B1}$); a product of the storage tank usage time factor ($B_2$) and a storage tank usage time weight factor ($W_{B2}$); and a product of the pipeline usage time factor ($B_3$) and a pipeline usage time weight factor ($W_{B3}$).

Preferably, the storage tank material factor ($A_1$) is a relative risk of a plurality of specified categories of storage tank materials, the storage tank protection measure factor ($A_2$) is a relative risk of a plurality of specified categories of storage tank protection measures, the pipeline material factor ($A_3$) is a relative risk of a plurality of specified categories of pipeline materials, the pipeline protection measure factor ($A_4$) is a relative risk of a plurality of specified categories of pipeline protection measures, the monthly average gasoline quantity factor ($B_1$) is a relative risk of a plurality of specified intervals of monthly average gasoline quantity, the storage tank usage time factor ($B_2$) is a relative risk of a plurality of specified intervals of storage tank usage time, and the pipeline usage time factor ($B_3$) is a relative risk of a plurality of specified intervals of pipeline usage time.

Preferably, the environment site assessment list includes: a high level unsystematic risk environmental site assessment list including underground storage tank systems recommended for performing an environmental site assessment with priority; a medium-high level unsystematic risk environmental site assessment list including underground storage tank systems determined for sequentially performing an environmental site assessment based on the unsystematic risk score (URS) of each underground storage tank system; a medium level unsystematic risk environmental site assessment list including underground storage tank systems recommended for enhancing self-management; and a low level unsystematic risk environmental site assessment list including underground storage tank systems that have no significant impact on the public and environment and are no need to further perform environmental site assessment.

Preferably, the actual soil gas detection data obtained from the environmental site assessment list includes a soil gas monitoring well gasoline gas concentration detection data and a soil gap gas compound qualitative detection data. The soil gas monitoring well gasoline gas concentration detection data consists of: the percentage of lower explosive limits (% LEL) (for each soil gas monitoring well) detected by a flammable gas detector; an gasoline gas concentration value detected by a photo ion detector (PID); and an gasoline gas concentration value detected by a flame ionization detector (FID). The soil gap gas compound qualitative detection data consists of: a methane concentration value, a methyl tert-butyl ether concentration value, a benzene concentration value, a toluene concentration value, an ethylbenzene concentration value, an xylene concentration value, a normal decane concentration value, and a naphthalene concentration value detected by a gas chromatography/flame ionization detector (GC/FID) for each soil gap gas sample.

Preferably, the risk control measures are based on the following contamination potential levels (CPL): a grade A contamination potential level list includes underground storage tank systems recommended for immediately performing an environmental site assessment; a grade B contamination potential level list includes underground storage tank systems recommended for performing a periodical follow-up soil gas detection; and a grade C contamination potential level list includes underground storage tank systems recommended for no need to perform further control due to no leakage pollution temporarily.

According to the present invention, a method for sorting unsystematic environment risk of underground storage tank systems provides a risk assessment result closer to the actual condition of the underground storage tank system, including contamination potential levels and an investigation list determined by the contamination potential levels, so as to efficiently conduct subsequent investigation and regulation on the underground storage tank systems and thus save much manpower, resource and time.

BRIEF DESCRIPTION OF THE DRAWINGS

The present invention will be apparent to those skilled in the art by reading the following detailed description of a preferred embodiment thereof, with reference to the attached drawings, in which:

FIG. 1 is a diagram illustrating a method for sorting unsystematic environment risk of underground storage tank systems.

DETAILED DESCRIPTION OF THE PREFERRED EMBODIMENT

The accompanying drawings are included to provide a further understanding of the invention, and are incorporated in and constitute a part of this specification. The drawing illustrates embodiments of the invention and, together with the description, serves to explain the principles of the invention. It is worth noting that the language of "include" in the specification is not used to limit the embodiments and should be interpreted as "include, but not limited to".

Referring to FIG. 1, it is a diagram illustrating the steps of a method for sorting unsystematic environment risk of underground storage tank systems according to the present invention.

Referring to step S10, in a preparation step, facility level factor data and operational status factor data are provided for each underground storage tank system. In one embodiment of the present invention, the facility level factors consist of a storage tank material factor ($A_1$), a storage tank protection measure factor ($A_2$), a pipeline material factor ($A_3$) and a pipeline protection measure factor ($A_4$), and the operational status factors consist of an monthly average gasoline quantity factor ($B_1$), a storage tank usage time factor ($B_2$) and a pipeline usage time factor ($B_3$).

Referring to the step S20, in an unsystematic environment risk assessment step, an risk weight assessment module is used to generate an unsystematic risk assessment result for each underground storage tank system, wherein the unsystematic risk assessment result is an unsystematic risk score (URS) and an unsystematic risk level is determined by the unsystematic risk score (URS). In one embodiment of the present invention, the risk weight assessment module utilizes the following equation (1) to generate the unsystematic risk score (URS).

$$URS = \sum_{i=1}^{4} A_i \times W_{Ai} + \sum_{j=1}^{3} B_j \times W_{Bj} \qquad (1)$$

In the above equation, $A_1$ is a relative risk of a plurality of specified categories of storage tank materials; $W_{A1}$ is a storage tank material weight factor; $A_2$ is a relative risk of a plurality of specified categories of storage tank protection measures; $W_{A2}$ is a storage tank protection measure weight factor; $A_3$ is a relative risk of a plurality of specified categories of pipeline materials; $W_{A3}$ is a pipeline material weight factor; $A_4$ is a relative risk of a plurality of specified categories of pipeline protection measures; $W_{A4}$ is a pipeline protection measure weight factor; $B_1$ is a relative risk of a plurality of specified intervals of monthly average gasoline quantity; $W_{B1}$ is a monthly average gasoline quantity weight factor; $B_2$ is a relative risk of a plurality of specified intervals of storage tank usage time; $W_{B2}$ is a storage tank usage time weight factor; $B_3$ is a relative risk of a plurality of specified intervals of pipeline usage time; and $W_{B3}$ is a pipeline usage time weight factor.

In the following Tables, Table 1 shows the corresponding relative risks of the storage tank material factor ($A_1$); Table 2 shows the corresponding relative risks of the storage tank protection measure factor ($A_2$); Table 3 shows the corresponding relative risks of the pipeline material factor ($A_3$); Table 4 shows the corresponding relative risks of the pipeline protection measure factor ($A_4$); Table 5 shows the corresponding relative risks of the monthly average gasoline quantity factor ($B_1$); Table 6 shows the corresponding relative risks of the storage tank usage time factor ($B_2$) and the pipeline usage time factor ($B_3$); and Table 7 shows the weight factor score of the preceding factors.

TABLE 1

Storage tank material factors ($A_1$) and the corresponding risks

| Types | The corresponding risks of factors ($A_1$) |
|---|---|
| Steel | 0.989 |
| Glass fiber reinforced plastic (single layer) | 0.921 |
| Glass fiber reinforced plastic (double layer) | 1.138 |

TABLE 2

Storage tank protection measure factors ($A_2$) and the corresponding risks

| Type | The corresponding risks of factors ($A_2$) |
|---|---|
| Installing cathodic corrosion protection system | 0.983 |
| Paint coating on the outer layer | 1.244 |
| Covering the outer layer with epoxy resin | 1.382 |
| Covering the outer layer with glass fiber | 0.691 |
| Covering the outer layer with asphalt | 1.176 |
| Covering the outer layer with polyethylene | 1.185 |
| Covering the outer layer with polyurethane | 0.395 |
| Covering the outer layer with an anti-corrosion strap | 2.764 |
| Use a secondary barrier protection | 0.908 |
| No proper protection | 1.382 |

TABLE 3

Pipeline material factors ($A_3$) and the corresponding risks

| Type | The corresponding risks of factors ($A_3$) |
|---|---|
| Steel | 0.996 |
| Glass fiber | 1.005 |
| Flexible tube with single layer | 1.701 |
| Flexible tube with double layer | 0.928 |

TABLE 4

Pipeline protection measure factors ($A_4$) and the corresponding risks

| Type | The corresponding risks of factors ($A_4$) |
|---|---|
| Installing cathodic corrosion protection system | 1.185 |
| Paint coating on the outer layer | 1.448 |
| Covering the outer layer with glass fiber | 1.082 |
| Covering the outer layer with polyethylene | 0.905 |
| Covering the outer layer with an anti-corrosion strap | 0.991 |
| Use a secondary barrier protection | 1.244 |
| No proper protection | 0.819 |

TABLE 5

Monthly average gasoline quantity factor ($B_1$) and the corresponding risks

| Type | The corresponding risks of factors ($B_1$) |
|---|---|
| <100,000 Litre/month | 1.474 |
| 100,001~200,000 Litre/month | 1.325 |
| 200,001~300,000 Litre/month | 0.633 |
| 300,001~400,000 Litre/month | 1.050 |
| 400,001~500,000 Litre/month | 1.053 |
| 500,001~600,000 Litre/month | 0.819 |
| 600,001~700,000 Litre/month | 0.790 |
| 700,001~800,000 Litre/month | 0.488 |
| 800,001~900,000 Litre/month | 0.873 |
| 900,001~1,000,000 Litre/month | 1.382 |
| >1,000,001 Litre/month | 1.164 |

TABLE 6

Storage tank usage time factor ($B_2$) and pipeline usage time factor ($B_3$) and the corresponding risks

| Storage tank usage time factor ($B_2$) | Corresponding risks | Pipeline usage time factor ($B_3$) | Corresponding risks |
|---|---|---|---|
| <1,000 days | 0.921 | <1,000 days | 1.106 |
| 1,001~2,000 days | 0.518 | 1,001~2,000 days | 0.711 |
| 2,001~3,000 days | 0.721 | 2,001~3,000 days | 0.744 |
| 3,001~4,000 days | 0.761 | 3,001~4,000 days | 0.833 |
| 4,001~5,000 days | 0.900 | 4,001~5,000 days | 0.742 |
| 5,001~6,000 days | 1.169 | 5,001~6,000 days | 1.106 |
| 6,001~7,000 days | 1.152 | 6,001~7,000 days | 1.463 |
| 7,001~8,000 days | 1.037 | 7,001~8,000 days | 0.921 |
| 8,001~9,000 days | 1.814 | 8,001~9,000 days | 1.974 |
| 9,001~10,000 days | 1.382 | 9,001~10,000 days | 1.626 |
| >10,001 days | 0.921 | >10,001 days | 1.106 |

The storage tank material weight factor ($W_{A1}$), the storage tank protection measure weight factor ($W_{A2}$), the pipeline material weight factor ($W_{A3}$), the pipeline protection measure weight factor ($W_{A4}$), the monthly average gasoline quantity weight factor ($W_{B1}$), the storage tank usage time weight factor ($W_{B2}$) and the pipeline usage time weight factor ($W_{B3}$) are calculated by an entropy weight method using the following equations (2)-(4) and the values of every weight factors are shown in the following Table 7.

$$E_i = -k \sum_{j=1}^{n} r_{ij} \times \ln r_{ij}, k = \frac{1}{\ln n}, i = A_1, \ldots, A_4, B_1, \ldots, B_3 \quad (2)$$

$$E = \sum_{i=A_1}^{B_3} E_i, i = A_1, \ldots, A_4, B_1, \ldots, B_3 \quad (3)$$

$$W_i = \frac{1 - E_i}{m - E} \quad (4)$$

In the above equations, $E_i$ is an entropy value of the i-th facility level factor and operating status factor; $r_{ij}$ is a standardized score of j-th calculated sample in the i-th facility level factor and the operating status factor, the standardized score is calculated by standardizing the corresponding risks; m is the number of facility level factors and the operating status factors, the number of factors is seven in the present invention; n is the number of samples, 340 samples in the present invention; E is a sum of the entropy values for each facility level factor and operating status factor; and $W_i$ is a value of each weight factor.

TABLE 7

Weight factors $W_{A1}$~$W_{B3}$ and the corresponding values

| Weight factor | Corresponding value |
| --- | --- |
| Storage tank material ($W_{A1}$) | 0.002 |
| Storage tank protection measure ($W_{A2}$) | 0.268 |
| Pipeline material ($W_{A3}$) | 0.038 |
| Pipeline protection measure ($W_{A4}$) | 0.049 |
| Monthly average gasoline quantity ($W_{B1}$) | 0.156 |
| Storage tank usage time ($W_{B2}$) | 0.245 |
| Pipeline usage time ($W_{B3}$) | 0.241 |

The following Table 8 shows the unsystematic risk score (URS), cumulative probability and unsystematic risk level of underground storage tank systems, wherein a high risk level range is a unsystematic risk score cumulative probability of more than 90% and the unsystematic risk score (URS) ranging between 1.3~2.0; a medium-high risk level range is a unsystematic risk score cumulative probability of 70-90% and the unsystematic risk score (URS) ranging between 1.1~1.3; a medium risk level range is a unsystematic risk score cumulative probability of 40-70% and the unsystematic risk score (URS) ranging between 1.1~1.3; and a low risk level range is a unsystematic risk score cumulative probability of less than 40% and the unsystematic risk score (URS) ranging between 0.5~1.0.

TABLE 8

Unsystematic risk scores, cumulative probability and unsystematic risk levels of underground storage tank systems

| Unsystematic risk level | Cumulative probability (%) | Unsystematic risk score |
| --- | --- | --- |
| Low risk level | 0 | 0.563 |
| | 10 | 0.804 |
| | 20 | 0.887 |
| | 30 | 0.948 |
| Medium risk level | 40 | 0.996 |
| | 50 | 1.043 |
| | 60 | 1.087 |
| Medium-high risk level | 70 | 1.139 |
| | 80 | 1.230 |
| High risk level | 90 | 1.306 |
| | 100 | 1.953 |

Referring to the step S30: in an environmental site assessment step, the actual soil gas detection data for each underground storage tank system are obtained. Firstly, an environmental site assessment list is determined based on the unsystematic risk scores (URS) and the unsystematic risk levels of underground storage tank systems. If the unsystematic risk score (URS) ranges between 1.3~2.0, the underground storage tank system is determined as the high level environmental site assessment list. If the unsystematic risk score (URS) ranges between 1.1~1.3, the underground storage tank system is determined as the medium high level environmental site assessment list. If the unsystematic risk score (URS) ranges between 1.0~1.1, the underground storage tank system is determined as the medium level environmental site assessment list. If the unsystematic risk score (URS) ranges between 0.5~1.0, the underground storage tank system is determined as the low level environmental site assessment list. Then, the actual soil gas detection of the underground storage tank system in the high level environmental site assessment list are performed in order to obtain the actual soil gas detection data, which includes a soil gas monitoring well gasoline gas concentration detection data and a soil gap gas compound qualitative detection data. The soil gas monitoring well gasoline gas concentration detection data consists of: the percentage of lower explosive limits (% LEL) (for each soil gas monitoring well) detected by a flammable gas detector; an gasoline gas concentration value detected by a photo ion detector (PID); and an gasoline gas concentration value detected by a flame ionization detector (FID). The soil gap gas compound qualitative detection data consists of: a methane concentration value, a methyl tert-butyl ether concentration value, a benzene concentration value, a toluene concentration value, an ethylbenzene concentration value, an xylene concentration value, a normal decane concentration value, and a naphthalene concentration value detected by a gas chromatography/flame ionization detector (GC/FID) for each soil gap gas sample.

Referring to the step S40, in a contamination potential assessment step, generating a contamination potential assessment result using a contamination potential assessment module based on the actual soil gas detection data for each underground storage tank system in the step S30, which is a contamination potential level (CPL). CPL can be obtained from the following equation (5).

$$CPL = \begin{cases} A, & \text{if } S_{soil\ gas} \geq 15 \\ B, & \text{if } 4 \geq S_{soil\ gas} > 15 \\ C, & \text{if } S_{soil\ gas} < 4 \end{cases} \quad (5)$$

In the above equation, $S_{soil\ gas}$ is a soil gas risk factor, which can be obtained from the following equation (6) according to the actual soil gas risk detection data.

$$S_{soil\ gas} = I_1 + I_2 + I_3 + I_4 + I_5 \quad (6)$$

In the above equation, the soil gas risk factor ($S_{soil\ gas}$) is a sum of a gasoline gas concentration warning factor ($I_1$), a gasoline gas concentration alarm factor ($I_2$), a plurality of gasoline gas concentration alarm factor ($I_3$), a gasoline characteristic compound factor ($I_4$), and a methane concentration alarm factor ($I_5$), wherein the corresponding values of the preceding factors are obtained by calculating the actual soil gas detection data of each storage tank, as shown in Table 9. It is worth noting that based on the classification and description of Table 9, a person with ordinary skill in the present technical field can evaluate each factor according to the actual soil gas detection data, which has repeatability and reproducibility.

TABLE 9

The determination criteria of factors $I_1$~$I_5$ and the corresponding values

| Factors | Determination criteria | Corresponding values | |
|---|---|---|---|
| | | Meeting the criteria | Not meeting the criteria |
| Gasoline gas concentration warning factor ($I_1$) | Have at least any one of the following detection results:<br>1. The gasoline gas concentration value detected by a photo ion detector (PID) >250 ppmV<br>2. The gasoline gas concentration value detected by a flame ionization detector (FID) >250 ppmV. | 1 | 0 |
| Gasoline gas concentration alarm factor ($I_2$) | Have at least any one of the following detection results:<br>1. The percentage of lower explosive limits (% LEL) >25%<br>2. The gasoline gas concentration value detected by a photo ion detector (PID) >500 ppmV<br>3. The gasoline gas concentration value detected by a flame ionization detector (FID) >500 ppmV | 3 | 0 |
| A plurality of gasoline gas concentration alarm factor ($I_3$) | Have at least any two of the following detection results:<br>1. The percentage of lower explosive limits (% LEL) >25%<br>2. The gasoline gas concentration value detected by a photo ion detector (PID) >500 ppmV<br>3. The gasoline gas concentration value detected by a flame ionization detector (FID) >500 ppmV | 6 | 0 |
| Gasoline characteristic compound factor ($I_4$) | The detection result of the soil gap gas compound includes at least two of the following compounds: methyl tert-butyl ether, benzene, methyl benzene, ethylbenzene, xylene, normal decane, naphthalene | 5 | 0 |
| Methane concentration alarm factor ($I_5$) | The methane concentration value detected in the soil gap gas compound >2,000 ppmV | 5 | 0 |

Referring to the step S50: in a risk control step, an investigation list is generated according to the contamination potential assessment result of each underground storage tank system as a basis for subsequent investigation and regulation on the underground storage tank systems. First of all, a risk list is determined according to the contamination potential level (CPL). That is, a grade A contamination potential level list is determined as a high environmental risk level list including underground storage tank systems recommended for immediately performing an environmental site assessment; the grade B contamination potential level list is determined as a medium environmental risk level list including underground storage tank systems recommended for performing a periodical follow-up soil gas detection; and the grade C contamination potential level list is determined as a low environmental risk level list including underground storage tank systems recommended for no need to perform further control due to no leakage pollution temporarily. Table 10 shows risk control measures for the underground storage tank systems, in which gas stations A to I represent the underground storage tank systems of the gas stations.

TABLE 10

Risk control measures

| List Type | Underground storage tank system | Risk control measures |
|---|---|---|
| Low environmental risk level list | Gas stations A, B, C, D | No need to further perform environmental site assessment due to no significant impact on the public and environment |
| Medium environmental risk level list | Gas stations E, F, G | Need to perform a periodical follow-up soil gas detection |
| High environmental risk level list | Gas stations H, I | Need to immediately perform an environmental site assessment |

The method for sorting unsystematic environment risk for underground storage tank systems according to the present invention provides the following advantages: the investigator can obtain a preliminarily screened environmental site assessment list according to the unsystematic environment risk assessment steps, and thus narrows the scope of the environmental site risk assessment, obtain actual gasoline gas detection data from the environmental site assessment list, and generate a risk assessment result closer to the actual condition of the underground storage tank systems so as to efficiently and accurately conduct subsequent investigation and regulation on the underground storage tank systems.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A method for sorting unsystematic environment risk of underground storage tank systems, comprising:
   a preparation step, providing a baseline database for the underground storage tank systems, the baseline database comprising facility level factor data and operational status factor data for each underground storage tank system;
   an unsystematic environment risk assessment step, generating an unsystematic risk assessment result for each underground storage tank system using an entropy weight assessment module based on the facility level factor data and the operational status factor data of the baseline database;
   an environmental site assessment step, generating an environmental site assessment list based on the unsystematic risk assessment result and obtaining an actual soil gas detection data for each underground storage tank system in the environmental site assessment list;
   a contamination potential assessment step, generating a contamination potential assessment result using a contamination potential assessment module based on the actual soil gas detection data for each underground storage tank system; and
   a risk control step, generating an investigation list according to the contamination potential assessment result of each underground storage tank system as a basis for subsequent investigation and regulation on the underground storage tank systems.

2. The method according to claim 1, wherein the facility level factor data is selected from a group consisting of a storage tank material factor ($A_1$), a storage tank protection measure factor ($A_2$), a pipeline material factor ($A_3$) and a pipeline protection measure factor ($A_4$), and the operational status factor data is selected from a group consisting of a monthly average gasoline quantity factor ($B_1$), a storage tank usage time factor ($B_2$) and a pipeline usage time factor ($B_3$).

3. The method according to claim 1, wherein the unsystematic risk assessment result consists of an unsystematic risk score (URS) and an unsystematic risk level determined by the unsystematic risk score (URS), wherein the environmental site assessment list is determined by the unsystematic risk level.

4. The method according to claim 3, wherein the unsystematic risk score (URS) is a sum of the following factors: a product of the storage tank material factor ($A_1$) and a storage tank material weight factor ($W_{A1}$); a product of the storage tank protection measure factor ($A_2$) and a storage tank protection measure weight factor ($W_{A2}$); a product of the pipeline material factor ($A_3$) and a pipeline material weight factor ($W_{A3}$); a product of the pipeline protection measure factor ($A_4$) and a pipeline protection measure weight factor ($W_{A4}$); a product of the monthly average gasoline quantity factor ($B_1$) and a monthly average gasoline quantity weight factor ($W_{B1}$); a product of the storage tank usage time factor ($B_2$) and a storage tank usage time weight factor ($W_{B2}$); and a product of the pipeline usage time factor ($B_3$) and a pipeline usage time weight factor ($W_{B3}$).

5. The method according to claim 4, wherein the storage tank material factor ($A_1$) is a relative risk of a plurality of specified categories of storage tank materials, the storage tank protection measure factor ($A_2$) is a relative risk of a plurality of specified categories of storage tank protection measures, the pipeline material factor ($A_3$) is a relative risk of a plurality of specified categories of pipeline materials, the pipeline protection measure factor ($A_4$) is a relative risk of a plurality of specified categories of pipeline protection measures, the monthly average gasoline quantity factor ($B_1$) is a relative risk of a plurality of specified intervals of monthly average gasoline quantity, the storage tank usage time factor ($B_2$) is a relative risk of a plurality of specified intervals of storage tank usage time, and the pipeline usage time factor ($B_3$) is a relative risk of a plurality of specified intervals of pipeline usage time.

6. The method according to claim 4, wherein the storage tank material weight factor ($W_{A1}$), the storage tank protection measure weight factor ($W_{A2}$), the pipeline material weight factor ($W_{A3}$), the pipeline protection measure weight factor ($W_{A4}$), the monthly average gasoline quantity weight factor ($W_{B1}$), the storage tank usage time weight factor ($W_{B2}$) and the pipeline usage time weight factor ($W_{B3}$) are calculated by an entropy weight method according to the baseline database for the underground storage tank systems.

7. The method according to claim 1, wherein the environment site assessment list comprises: a high level unsystematic risk environmental site assessment list including underground storage tank systems recommended for performing an environmental site assessment with priority; a medium-high level unsystematic risk environmental site assessment list including underground storage tank systems determined for sequentially performing an environmental site assessment based on the unsystematic risk score (URS) of each underground storage tank system; a medium level unsystematic risk environmental site assessment list including underground storage tank systems recommended for enhancing self-management; and a low level unsystematic risk environmental site assessment list including underground storage tank systems that have no significant impact on the public and environment and are no need to further perform environmental site assessment.

8. The method according to claim 1, wherein the contamination potential assessment result comprises a contamination potential level (CPL), wherein the investigation list is determined by the contamination potential level (CPL).

9. The method according to claim 8, wherein the contamination potential level (CPL) is obtained by calculating a soil gas risk factor ($S_{soil\ gas}$).

10. The method according to claim 9, wherein the soil gas risk factor ($S_{soil\ gas}$) is obtained by summing up a gasoline gas concentration warning factor ($I_1$), a gasoline gas concentration alarm factor ($I_2$), a plurality of gasoline gas concentration alarm factor ($I_3$), a gasoline characteristic compound factor ($I_4$), and a methane concentration alarm factor ($I_5$), wherein the preceding factors are obtained by calculating the actual soil gas detection data.

11. The method according to claim 8, wherein the investigation list comprises a high environmental risk level list including underground storage tank systems recommended for performing an immediate site assessment.

* * * * *